Inventor:
William E. Holcombe,
by (signature)
His Attorney.

UNITED STATES PATENT OFFICE.

WILLIAM E. HOLCOMBE, OF SCHENECTADY, NEW YORK, ASSIGNOR TO GENERAL ELECTRIC COMPANY, A CORPORATION OF NEW YORK.

DYNAMO-ELECTRIC MACHINE.

1,269,537.  Specification of Letters Patent.  Patented June 11, 1918.

Application filed January 8, 1916. Serial No. 70,950.

*To all whom it may concern:*

Be it known that I, WILLIAM E. HOLCOMBE, a citizen of the United States, residing at Schenectady, county of Schenectady, State of New York, have invented certain new and useful Improvements in Dynamo-Electric Machines, of which the following is a specification.

My invention relates to dynamo-electric machines and particularly to the ventilation of such machines. Dynamo-electric machines of large capacity and which operate at high speed, such as turbine-driven machines, are usually of small diameter and consequently are of great length. The ventilation of such machines presents great difficulties, particularly the ventilation of those parts which are located at a distance from the source of cooling fluid. This is due to the fact that in prior constructions, the cooling fluid before reaching distant parts of the machine becomes very hot and therefore cannot properly cool such parts. My invention has for its object to provide an improved cooling means for such machines, in which cooling fluid is delivered directly to the parts of the machine distant from the source of cooling fluid as well as directly to the parts nearer the source, whereby the heat generated in the machine will be carried away in a quick and effective manner.

Figure 1:
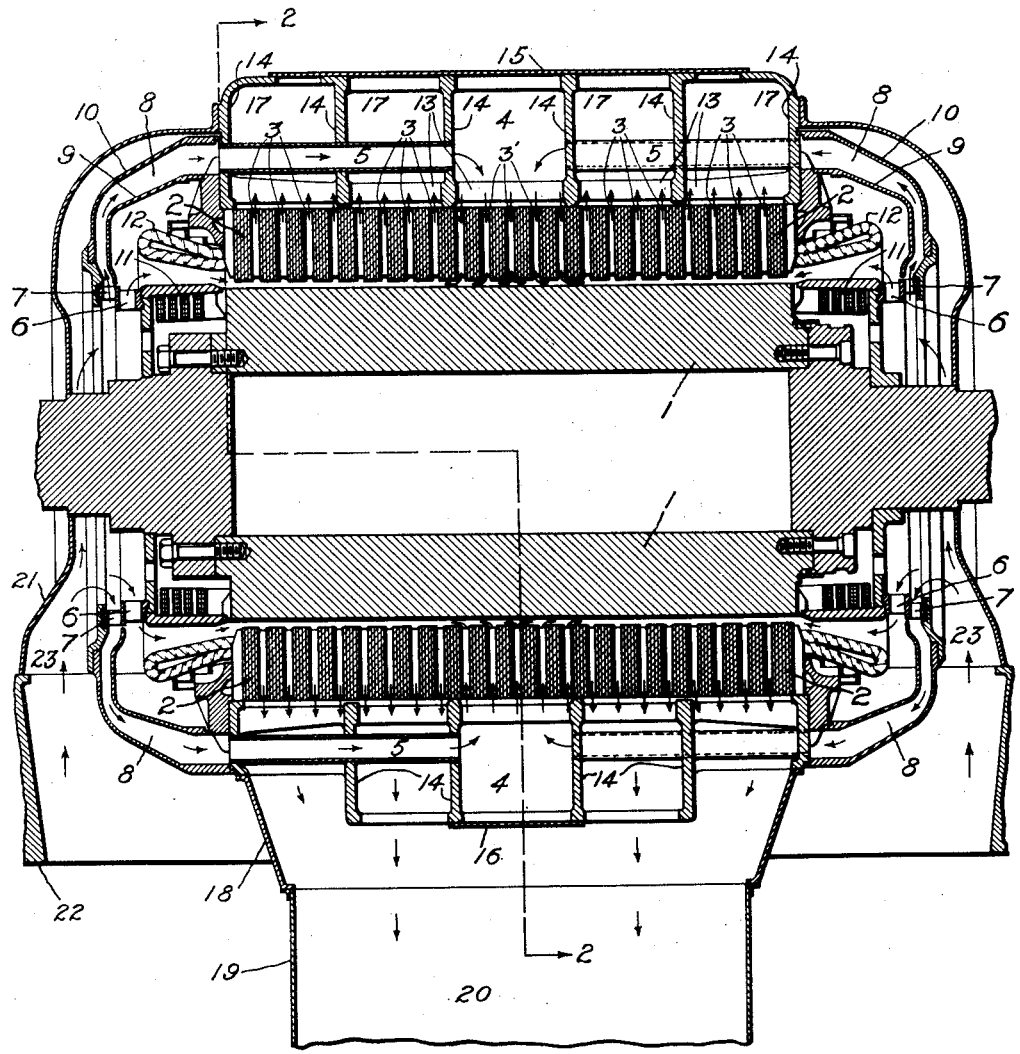
Figure 2:
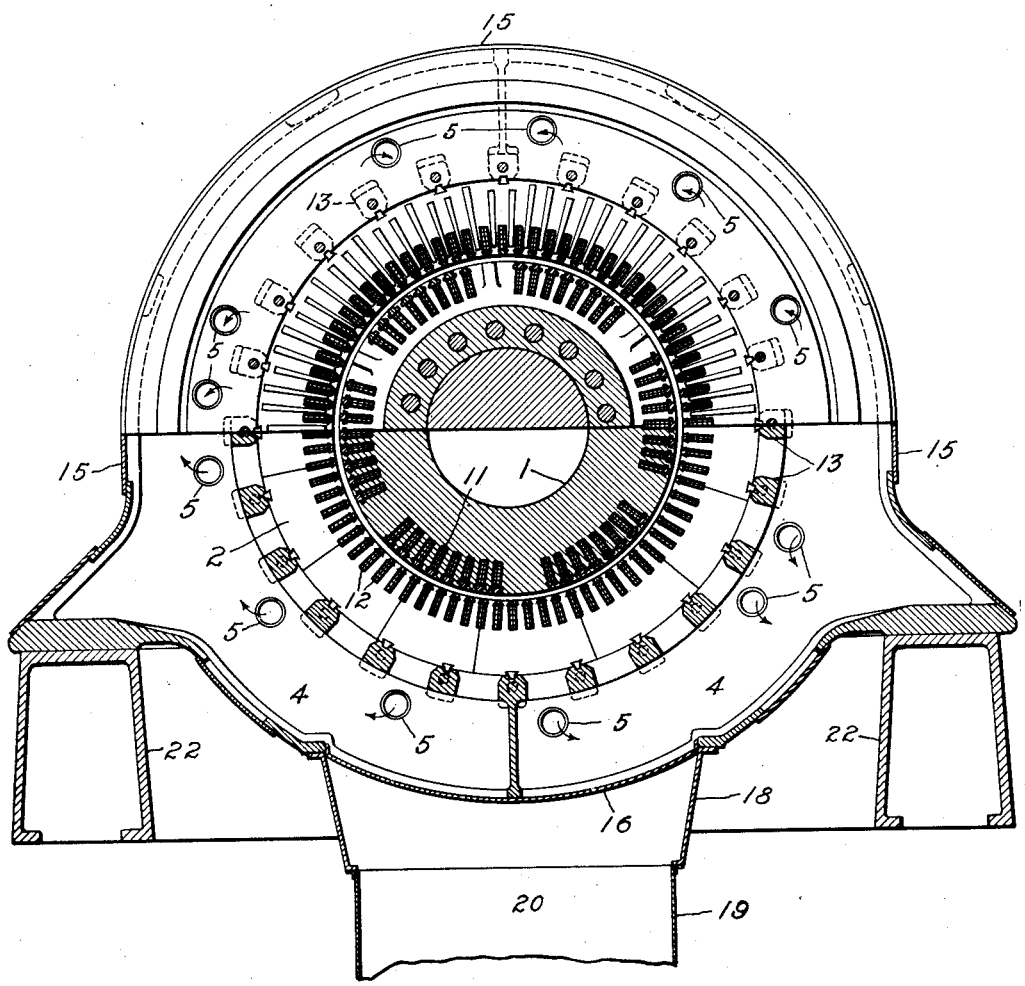

To the above end, my invention consists in certain novel features of construction, which will be pointed out with particularity in the claims annexed to and forming a part of this specification. For a better understanding of my invention, reference may be had to the following description taken in connection with the accompanying drawing, in which Figure 1 is a sectional view of a dynamo-electric machine embodying my invention, and Fig. 2 is a section on the line 2—2 of Fig. 1.

Referring to the drawing, 1 is a rotatable member of a dynamo-electric machine which is surrounded by a laminated stationary member 2. The stationary member is provided with radial ventilating spaces 3 and 3′. In accordance with my invention, cooling fluid is delivered directly to the outer periphery of the adjacent ventilating spaces 3′ located at a distance from the source of cooling fluid and to the inner periphery of the adjacent ventilating spaces 3, located nearer to the source of cooling fluid. Cooling fluid is thus simultaneously supplied to the hottest parts of the machine and consequently they are all effectively ventilated. In the particular arrangement shown the ventilating spaces 3′ are those located near the center of the machine, and the ventilating spaces 3 are those located at the ends of the machine. A chamber 4 is provided about the outer periphery of the ventilating spaces 3′, and cooling fluid is conveyed thereto by means of conduits 5. At each end of the rotatable member there is provided a ventilating member which comprises inner and outer fan members 6 and 7. The fan members 7 deliver cooling fluid to the passages 8 and thereby to the conduits 5. The passages 8 are formed by means of the two shields 9 and 10. The fan members 6 force air into the air gap between the rotatable member 1 and the stationary member 2 and thereby to the inner periphery of the ventilating spaces 3. The shield 9 is in operative relation with these fan members and causes the air delivered by them to flow as explained hereinafter.

From the drawings it will be seen that the rotatable member is of ordinary construction and is provided with exciting windings 11. The stationary member is provided with windings 12 situated in slots in the laminations. The laminations forming the stationary member 2 are mounted in a frame member which comprises ribs 13 and web members 14. A casing member 15 surrounds the exterior surfaces of the upper portions of the web members 14, and a casing member 16 is fastened to the middle web members at the bottom of the machine. The chamber 4 is formed by the middle web members, the casing member 15 and the casing member 16. The casing member 16 and the web members 14 form chambers 17 about the upper portion of the outer periphery of the ventilating spaces 3. The outer web members 14 have fastened thereto a member 18 which has fastened thereto a member 19. The members 18 and 19 form an outlet duct 20 communicating with the chambers 17. The ends of the machine are inclosed by means of shields 21 which with the base 22 of the machine and the shield 10 form an inlet duct 23.

The circulation of air through my machine is indicated in the drawing by arrows.

When the rotatable member 1 revolves, air is drawn in through the inlet duct 23 and is then blown by the outer fan members 7 through the passages 8 into the conduits 5 from whence it is discharged into the chamber 4. The air then flows through the ventilating spaces 3' in the stationary member and is discharged into the air gap between the rotatable and stationary members. Air is also drawn through the inner fans 6 and is forced thereby over the windings 12 on the stationary member and also over the windings 11 on the rotatable member, thence into the air gap where it unites with the air discharged therein from the ventilating spaces 3'. The outer fan members 7 are arranged to create a greater pressure than the inner fan members 6, so as to insure a flow of air from the chamber 4 through the ventilating ducts 3' and into the air gap and thus avoid the formation of pockets of dead air. The streams of air thus combined pass through the ventilating spaces 3, escaping from the outer periphery thereof into the chambers 17 and thence it is conveyed from the machine by the outlet duct 20. In the drawing this outlet duct is shown as being situated in the base of the machine. It is well known, however, that the heated air may be discharged from the chambers 17 formed between the casing member 15 and the stationary member 2 directly into the room at the top of the machine.

I desire it to be understood that my invention is not limited to the particular arrangement shown and described, and I aim in the appended claims to cover all modifications which do not depart from the spirit and scope of my invention.

What I claim as new and desire to secure by Letters Patent of the United States, is,—

1. In a dynamo-electric machine, a rotatable member, a laminated stationary member surrounding said rotatable member and having radial ventilating spaces, means for conveying cooling fluid to the outer periphery of a group of adjacent ventilating spaces, and means for conveying cooling fluid to the air gap between said rotatable and said stationary members and thereby to the inner periphery of another group of adjacent ventilating spaces.

2. In a dynamo-electric machine, a rotatable member, a laminated stationary member surrounding said rotatable member and having radial ventilating spaces, means forming a chamber about the outer periphery of a group of adjacent ventilating spaces, means for conveying cooling fluid to said chamber, and means for conveying cooling fluid to the air gap between said rotatable and said stationary members and thereby to the inner periphery of another group of adjacent ventilating spaces.

3. In a dynamo-electric machine, a rotatable member, ventilating means rotatable with the rotatable member, a stationary member surrounding said rotatable member and having radial ventilating spaces, means in operative relation with said ventilating means for conveying cooling fluid to the outer periphery of a group of adjacent ventilating spaces located at a distance from said ventilating means, and other means in operative relation with said ventilating means for conveying cooling fluid to the air gap between said rotatable and said stationary members and thereby to the inner periphery of another group of adjacent ventilating spaces located near said ventilating means.

4. In a dynamo-electric machine, a rotatable member, ventilating means rotatable with the rotatable member, a stationary member surrounding said rotatable member and having radial ventilating spaces, means forming a chamber about the outer periphery of a group of adjacent ventilating spaces located at a distance from said ventilating means, means in operative relation with said ventilating means for conveying cooling fluid to said chamber, and other means also in operative relation with said ventilating means for conveying cooling fluid to the air gap between said rotatable and said stationary members and thereby to the inner periphery of another group of adjacent ventilating spaces located near said ventilating means.

5. In a dynamo-electric machine, a rotatable member, ventilating means mounted on each end of said rotatable member, a laminated stationary member surrounding said rotatable member and having radial ventilating spaces, means in operative relation with said ventilating means for conveying cooling fluid to the outer periphery of the centrally located, adjacent ventilating spaces, and means also in operative relation with said ventilating means for conveying cooling fluid to the air gap between the rotatable and stationary members and thereby to the inner periphery of the adjacent ventilating spaces located at the ends of the stationary member.

6. In a dynamo-electric machine, a rotatable member, ventilating means mounted on each end of said rotatable member, a laminated stationary member surrounding said rotatable member and having radial ventilating spaces, means forming a chamber about the outer periphery of the centrally located, adjacent ventilating spaces, means in operative relation with said ventilating means for conveying cooling fluid to said chamber, and other means also in operative relation with said ventilating means for conveying cooling fluid to the air gap between the rotatable and stationary members and thereby to the inner periphery of the adjacent ventilating spaces located at the ends of the stationary member.

7. In a dynamo-electric machine, a rotatable member, a plurality of fan members mounted on each end of said rotatable member, a laminated stationary member surrounding said rotatable member and having radial ventilating spaces, means in operative relation with one of said fan members at each end of said rotatable member for conveying cooling fluid to the outer periphery of the centrally located ventilating spaces, and means in operative relation with the other of said fan members for conveying cooling fluid to the air gap between the rotatable and the stationary members and thereby to the inner periphery of the ventilating spaces located at the ends of the stationary member, said fan members delivering cooling fluid to said centrally located ventilating spaces being arranged to create a greater pressure than said other fan members.

8. In a dynamo-electric machine, a rotatable member, a plurality of fan members mounted on each end of said rotatable member, a laminated stationary member surrounding said rotatable member and having radial ventilating spaces, means forming a chamber about the outer periphery of the centrally located ventilating spaces, means in operative relation with one of said fan members at each end of said rotatable member for conveying cooling fluid to said chamber, and means in operative relation with the other of said fan members for conveying cooling fluid to the air gap between the rotatable and stationary members and thereby to the inner periphery of the ventilating spaces located at the ends of the stationary member, said fan members delivering cooling fluid to said chamber being arranged to create a greater pressure than said other fan members.

9. In a dynamo-electric machine, a rotatable member, a plurality of fan members mounted on each end of said rotatable member, a laminated stationary member surrounding said rotatable member and having radial ventilating spaces, means forming a chamber about the outer periphery of the centrally located ventilating spaces, conduits in operative relation with one of said fan members at each end of said rotatable member for conveying cooling fluid to said chamber, and a shield for causing the air from said other fan members to flow into the air gap between the rotatable and stationary members and thereby to the inner periphery of the ventilating spaces located at the ends of the stationary member, said fan members delivering cooling fluid to said chamber being arranged to create a greater pressure than said other fan members.

10. In a dynamo-electric machine, a rotatable member, an inner and an outer fan member mounted on each end of said rotatable member, a laminated stationary member surrounding said rotatable member and having radial ventilating spaces, means in operative relation with said outer fan members for conveying cooling fluid to the outer periphery of the centrally located ventilating spaces, and means in operative relation with said inner fan members for conveying cooling fluid to the air gap between the rotatable and the stationary members and thereby to the inner periphery of the ventilating spaces located at the ends of the stationary member, said outer fan members being arranged to create a greater pressure than said inner fan members.

11. In a dynamo-electric machine, a rotatable member, an inner and an outer fan member mounted on each end of said rotatable member, a laminated stationary member surrounding said rotatable member and having radial ventilating spaces, means forming a chamber about the outer periphery of the centrally located ventilating spaces, means in operative relation with the other of said fan members for conveying cooling fluid to said chamber, and means in operative relation with said inner fan members for conveying cooling fluid to the air gap between the rotatable and stationary members and thereby to the inner periphery of the ventilating spaces located at the ends of the stationary member, said outer fan members being arranged to create a greater pressure than said inner fan members.

12. In a dynamo-electric machine, a rotatable member, an inner and an outer fan member mounted on each end of said rotatable member, a laminated stationary member surrounding said rotatable member and having radial ventilating spaces, means forming a chamber about the outer periphery of the centrally located ventilating spaces, conduits in operative relation with said outer fan members for conveying cooling fluid to said chamber, and a shield for causing the air from said inner fan members to flow into the air gap between the rotatable and stationary members and thereby to the inner periphery of the ventilating spaces located at the ends of the stationary member, said outer fan members being arranged to create a greater pressure than said inner fan members.

In witness whereof, I have hereunto set my hand this 5th day of January, 1916.

WILLIAM E. HOLCOMBE.